455/3

Nov. 4, 1952 M. R. MANTZ 2,616,973

H2-2347 COMBINED RADIO AND INTERCOMMUNICATION SYSTEM

Filed Oct. 19, 1948 2 SHEETS—SHEET 1

INVENTOR
Marius Robert Mantz
By Fred M Vogel
AGENT

Nov. 4, 1952 M. R. MANTZ 2,616,973

COMBINED RADIO AND INTERCOMMUNICATION SYSTEM

Filed Oct. 19, 1948 2 SHEETS—SHEET 2

INVENTOR
Marius Robert Mantz

By

AGENT

Patented Nov. 4, 1952 2,616,973

UNITED STATES PATENT OFFICE 2,616,973

COMBINED RADIO AND INTERCOMMUNICATION SYSTEM

Marius Robert Mantz, Eindhoven, Netherlands, assignor to Hartford National Bank and Trust Company, Hartford, Conn., as trustee Application October 19, 1948, Serial No. 55,268
In the Netherlands December 23, 1947

7 Claims. (Cl. 179—2)

This invention relates to a communication apparatus comprising several microphones which are connected through a common communication amplifier to associated reproducing devices and comprising a transmitter which is adapted to be engaged through one of the microphones.

In such devices which are used, for example, for communication on board aeroplanes it is known to construct the apparatus, with the use of four wire termination, in such manner that the communication amplifier is adapted to be engaged, for intercommunication, through all microphones, the transmitter, however, solely through the transmitter microphone.

The invention has for its object to simplify such a communication apparatus.

According to the invention the microphones, with the exception of the transmitter microphone, are connected to the input circuit of the communication amplifier, and a double-acting attenuator is connected between this input circuit and a point of the transmitter cascade at which the signals from the transmitter microphone appear after having been amplified.

The amplified transmitter microphone signals are preferably taken from the output circuit of a modulation amplifier of the transmitter.

In order that the invention may be more clearly understood and readily carried into effect, it will now be described more fully with reference to the accompanying drawings, given by way of example.

Figure 3:
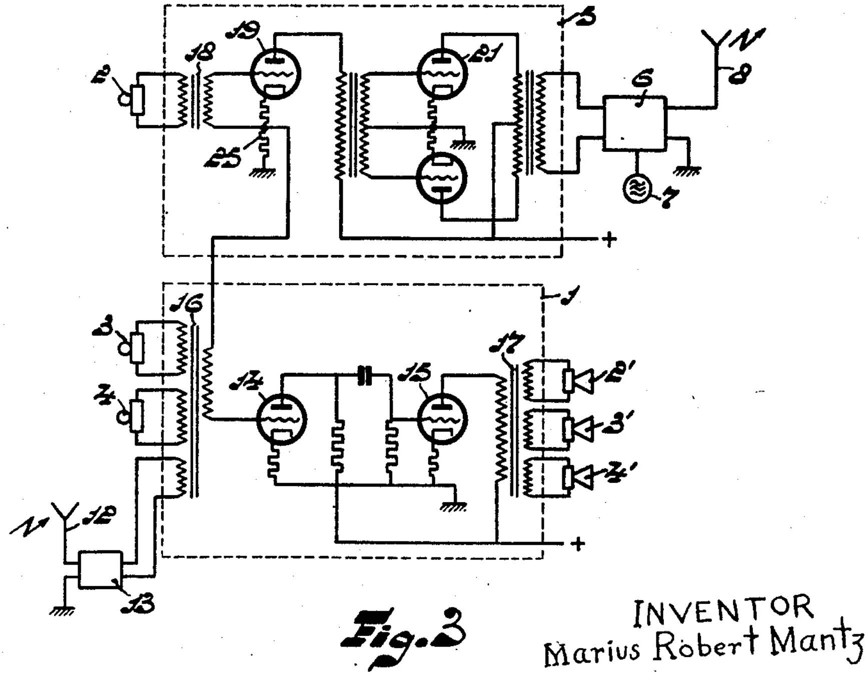

In the particularly suitable communication apparatus shown in Fig. 3 one amplification stage in the transmitter cascade may be economized.

In the drawings corresponding elements bear the same reference numerals.

Figure 1:
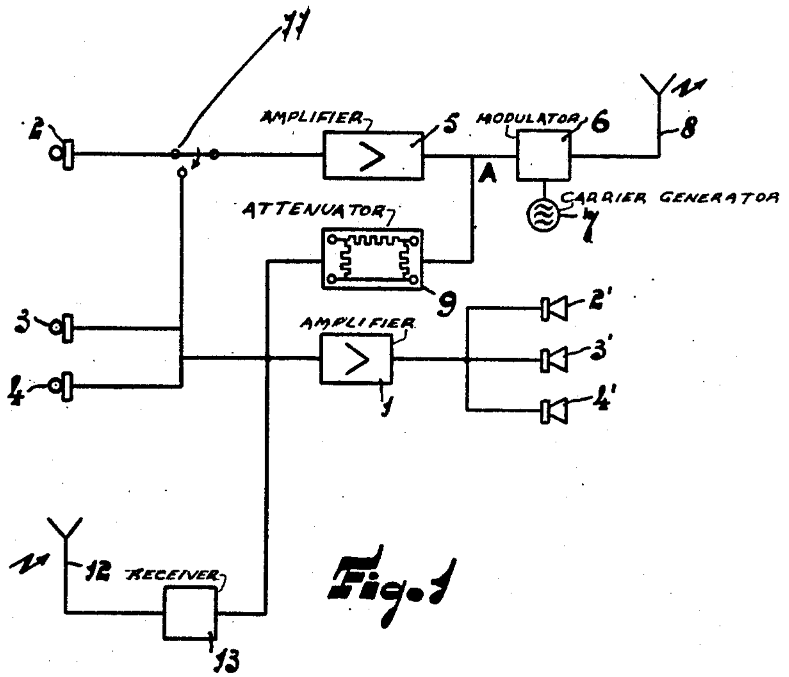
Fig. 1 is a block diagram of the communication apparatus according to the invention.

The communication apparatus shown in Fig. 1 comprises a communication amplifier 1 which should be adapted to be engaged through all microphones 2, 3, 4 and to the output circuit of which are connected in parallel reproducing devices 2', 3', 4' associated with the various microphones.

Furthermore the apparatus comprises a transmitter which is adapted to be engaged exclusively through the transmitter microphone 2 and which comprises a modulation amplifier 5, a modulator 6 which has connected to it a carrier-wave oscillator 7, and a transmitter aerial 8.

With the exception of the transmitter microphone 2, the microphones (in the present case 3, 4) are included in the input circuit of the communication amplifier. Furthermore a double-acting attenuator 9, for example consisting of resistance cells, is connected between this input circuit and the output circuit of the modulator amplifier 5.

The signals from the transmitter microphone and appearing, after having been amplified, in the output circuit of the modulation amplifier 5 are attenuated by this attenuator (attenuation for example 60 dbs) down to the normal microphone level and supplied to the input circuit of the communication amplifier 1, so that the latter is adapted to be engaged through each of the available microphones when the transmitter is switched on.

The signals from the microphones 3, 4 not connected to the input of the transmitter, are supplied to the output circuit of the modulation amplifier 5 subsequent to attenuation by the attenuator 9 to such a degree that, owing to the great difference in level between the signals from the transmitter microphone 2 and those from the other microphones, the latter are substantially imperceptible in the transmitted signals. In this manner cross-talk from the microphones 3, 4 to the transmitter cascade is avoided in a very simple manner.

With the transmitter apparatus being switched off, intercommunication is made possible by providing a switch 11 to be coupled with the switch for completely or partly switching off the transmitter. By means of the switch 11 the transmitter microphone 2, in parallel-connection with the other microphones 3, 4, can be connected to the input circuit of the communication amplifier 1.

In the presence of a receiver 13 connected to a receiver aerial 12, the board communication amplifier 1 may be utilized as a low-frequency amplifier for the incoming signals by supplying the incoming signals, subsequent to detection, to the input circuit of the amplifier 1.

If desired the system in Fig. 1 may include an additional switch in order that any of the available microphones may be used at will as a transmitter microphone.

Figure 2:
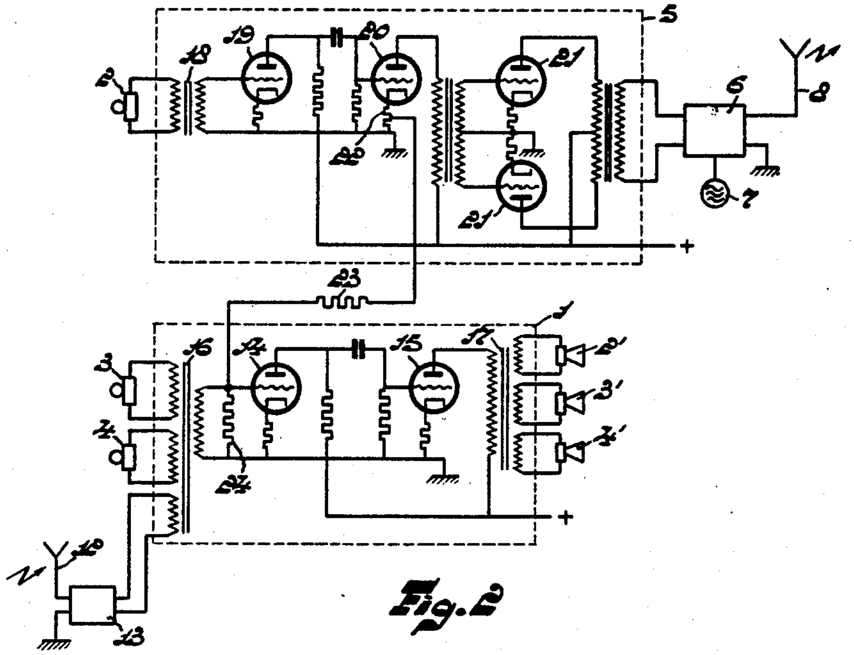
Fig. 2 shows in greater detail a communication apparatus according to the invention.

The communication apparatus shown in Fig. 2 comprises a communication amplifier 1 consisting of a microphone amplifier 14 and an energy amplifier 15 which should be adapted to be engaged through all the available microphones 2, 3, 4. The input circuit of the communication amplifier comprises a transformer 16 having separated primary windings to which all available microphones, with the exception of the transmitter microphone, and the output of the receiver 13 are connected, and the output circuit comprises a transformer 17 having a plurality of secondary windings to which the reproducing devices 2′, 3′, 4′ associated with the various microphones are connected.

The transmitter microphone 2 is connected, through a transformer 18, to a modulation amplifier which consists of the cascade-connection of a microphone amplifier 19, a pre-amplifier 20 and a push-pull connected energy amplifier 21.

To enable the communication amplifier 1 to be engaged through all microphones 2, 3, 4, without the occurrence of cross-talk from the microphones not connected to the transmitter input, in the present case 3, 4, to the transmitter cascade, the non-shunted cathode resistance 22 of the pre-amplifier 20 and the input circuit of the communication amplifier 1 have connected between them a double-acting attenuator consisting of part of the cathode resistance 22, a resistance 23 and a resistance 24.

When the transmitter apparatus is switched off, intercommunication is maintained without the need for auxiliary means, by switching off all stages of the transmitter cascade with the exception of the microphone amplifier 19 and the pre-amplifier 20.

In the communication apparatus shown in Fig. 3 the pre-amplification stage in the transmitter cascade can be dispensed with.

The anode circuit of the transmitter-microphone amplifier 19 comprises a coupling resistance 25 which consists of part of the cathode-resistance and is connected in series with the secondary winding of the input transformer 16 of the communication amplifier 1.

The value of the coupling resistance 25 is chosen to be such that the signals from the transmitter microphone 2 are supplied, at the normal microphone level, to the input circuit of the communication amplifier.

The coupling resistance 25 is, in fact, connected in series with the input impedance of the microphone amplifier 14 of the communication amplifier. Since the input impedance of the microphone amplifier 14 materially exceeds the coupling resistance 25 and, moreover, is greatly increased by a negative current feedback, only a very small part of the signals from the microphones 3, 4 which are not connected to the transmitter input, will occur across the coupling resistance 25.

The cross-talk level from the microphones 3, 4 not connected to the transmitter input, to the transmitter cascade is further reduced, since the coupling resistance 25 is not included in the input circuit of the transmitter-microphone amplifier 19.

It has been found in practice that on feeding the communication apparatus from a common feeder, decoupling of the various circuits should be bestown great care on, in order to avoid cross-talk due to the internal resistance of the source of supply voltage.

What I claim is:

1. Communication apparatus comprising a plurality of microphones, a radio transmitting system including a carrier generator, a modulator, means coupling said modulator to said generator for modulating said carrier and an audio amplifier whose input is connected to one of said microphones acting as the transmitter microphone and whose output is coupled to said modulator, an intercommunication system including reproducing means and a communication amplifier whose input is coupled to the remaining microphones and whose output is coupled to said reproducing means, an attenuation network, and means connecting said network between the output of said audio amplifier and input of said communication amplifier whereby signals originating from said transmitter microphone are heard in said intercommunication system but signals originating from the remaining microphones are not transmitted by said transmitting system.

2. Communication apparatus, as set forth in claim 1, wherein said network provides a degree of attenuation at which signals derived from said transmitter microphone and amplified in said audio amplifier are reduced in amplitude to the level of the remaining microphones in said intercommunication system, and in which signals derived from the remaining microphones are reduced to an imperceptible level in said transmitting system.

3. Communication apparatus, as set forth in claim 1, further including switching means for disconnecting said transmitter microphone from the input of said audio amplifier and for connecting said transmitter microphone to the input of said communication amplifier.

4. Communication apparatus comprising a plurality of microphones, a radio transmitting system including a carrier generator, a modulator, means coupling said modulator to said generator to modulate said carrier and an audio amplifier whose input is connected to one of said microphones acting as the transmitter microphone and whose output is coupled to said modulator, a radio receiving system including a detector, an intercommunication system including reproducing means a communication amplifier means coupling the input of said communication amplifier to the detector in said receiving system and to the remaining microphones and means coupling the output of the communication amplifier to said reproducer means, an attenuation network and means connecting said network between the output of said audio amplifier and the input of said communication amplifier whereby signals originating from the transmitter microphone and from the detector are heard in said intercommunication system but signals originating from the remaining microphones are not transmitted by said transmitting system.

5. Communication apparatus comprising a plurality of microphones, a radio transmitting system including a carrier generator, a modulator, means for coupling said modulator to said generator for modulating said carrier and audio amplifier whose input is connected to one of said microphones acting as transmitter microphone and whose output is coupled to said modulator, said audio amplifier being provided with an electron discharge tube having a cathode, a grid and anode and an un-bypassed resistor in the cathode circuit of said tube, an intercommunication system including reproducing means and a communication amplifier whose input is coupled to the remaining microphones and whose output is coupled to said reproducing means, an attenuation network and means connecting said network between the output of said audio amplifier and the input of said communication amplifier, said network including a resistance connected between a point in said cathode resistor and the input of said communication amplifier whereby signals originating in said transmitter microphone are heard in said intercommunication system but signals originating in the remaining microphones are not transmitted by said transmitting system.

6. Communication apparatus comprising a plurality of microphones, a radio transmitting system including a carrier generator, a modulator, means coupling said modulator to said generator to modulate said carrier and an audio amplifier whose input is connected to one of said microphones acting as the transmitter microphone and whose output is coupled to said modulator, said amplifier being provided with a first electron discharge tube having a cathode, a grid and an anode and a resistor in the cathode circuit of said first tube, a radio receiving system including a detector, an intercommunication system including a plurality of reproducers and a communication amplifier whose output is connected to said reproducer, said communication amplifier being provided with an input transformer having a secondary winding and a plurality of primary windings one of which is connected to said detector and the others being connected to the remaining microphones and a second electron discharge tube provided with a cathode, a grid and an anode, said secondary winding being coupled between the grid and cathode of said second tube, and an attenuation network connected between the output of said audio amplifier and the input of said communication amplifier and including a first resistance connected across said secondary winding and a second resistance connected between the grid of said second tube and a point in said cathode resistor whereby signals originating from said transmitter microphone and from said detector are heard in said intercommunication system but signals originating in the remaining microphones are not transmitted by said transmitting system.

7. Communication apparatus comprising a plurality of microphones, a radio transmitting system including a carrier generator, a modulator, means coupling said modulator to said generator to modulate said carrier and an audio amplifier whose input is connected to one of said microphones acting as a transmitter microphone and whose output is coupled to said modulator, said amplifier being provided with a first discharge tube having a cathode, a grid and an anode and circuits therefor, an intercommunication system including a plurality of reproducers and a communication amplifier whose output is connected to said reproducers, said communication amplifier being provided with an input transformer having a plurality of primary windings connected to respective remaining microphones, and a second electron discharge tube having a cathode, a grid and an anode, said secondary winding being coupled between the grid and cathode of said second tube, and an attenuation network connecting the output of said audio amplifier to the input of said communication amplifier, said network including a resistance interposed between the cathode circuit of said first tube and ground and means connecting said resistance in series with the secondary winding of said transformer whereby signals originating from said transmitter microphone and from said detector are heard in said intercommunication system but signals originating in the remaining microphones are not transmitted by said transmitting system.

MARIUS ROBERT MANTZ.

REFERENCES CITED

The following references are of record in the file of this patent:

UNITED STATES PATENTS

| Number | Name | Date |
|---|---|---|
| 2,077,552 | Findley | Apr. 20, 1937 |
| 2,164,960 | Stockton et al. | July 4, 1939 |
| 2,182,632 | Kierman | Dec. 5, 1939 |
| 2,433,413 | Withey | Dec. 30, 1947 |